Patented Aug. 15, 1950

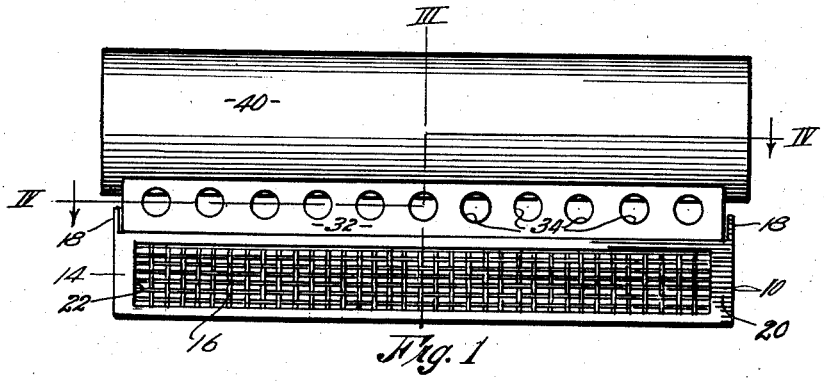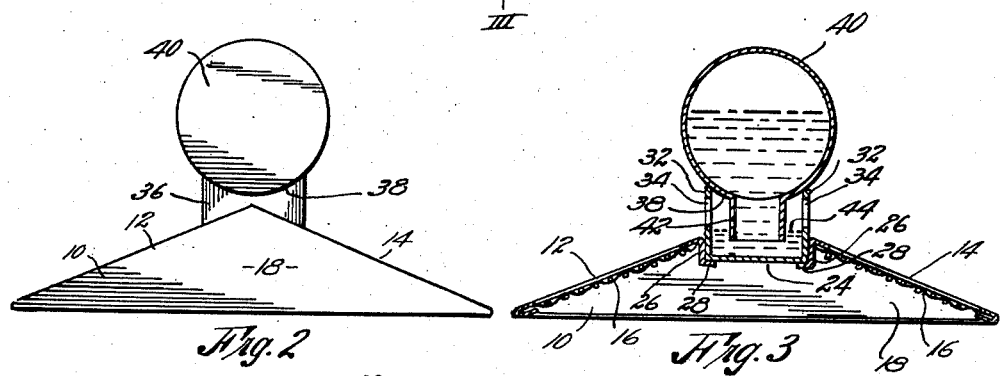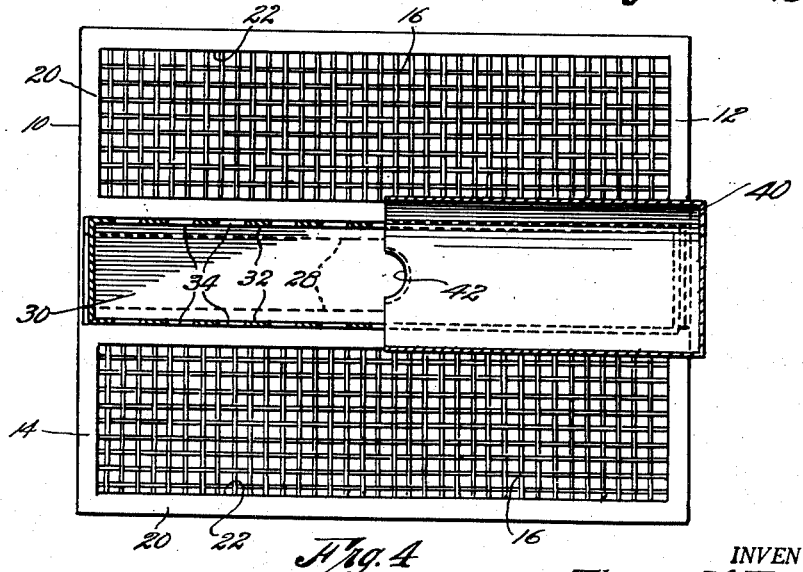

2,518,536

UNITED STATES PATENT OFFICE 2,518,536

POULTRY WATERING FOUNTAIN

Thomas K. Faulkner, Kansas City, Mo.

Application November 27, 1944, Serial No. 565,269

3 Claims. (Cl. 119—77)

This invention relates to improvements in poultry watering fountains and has for its principal object a watering fountain so constructed as to preclude contamination of the water by litter from the pen floor.

Another object of the invention is the provision of a watering fountain having an elevated trough and inclined runways leading to the opposite sides of said trough.

A further object of the invention is the provision of a watering fountain having a base, a trough removably mounted in said base and a reservoir cradled in said watering trough and communicating with said trough through an open tube which extends adjacent the bottom of said trough.

Another object of the invention is the provision of a trough having apertured side walls and a reservoir carried by said trough and extending beyond the opposite side walls of said tank.

Other objects are simplicity and economy of construction, ease and efficiency of operation and adaptability for use in watering all sizes of poultry.

With these objects in view, as well as other objects which will appear during the course of the specification, reference will now be had to the drawings wherein:

Figure 1 is a side elevation of a poultry watering fountain embodying my invention.

Fig. 2 is an end elevation of the water fountain shown in Fig. 1.

Fig. 3 is a cross sectional view taken on line III—III of Fig. 1.

Fig. 4 is a sectional plan view taken on line IV—IV of Fig. 1.

Throughout the several views like reference characters refer to similar parts and the numeral 10 designates a base of substantially triangular shape to present a pair of oppositely disposed runways 12 and 14 which are provided with open grill work 16 such as coarse wire screen or any other type of open work which would permit the passage of litter throughout. As shown, the base member frame comprises end walls 18 and inclined side walls 20 which are cut out at 22 to form openings which are covered by the screen 16. This screen also serves as a good footing for the chickens or other poultry. The upper central portion of the base is recessed at 24 and has downward projecting walls 26 with inturned flanges 28. These flanges serve as a rest for the water trough 30 which is removably positioned in recess 24 as clearly shown.

The side walls 32 of the trough are each provided with a series of openings 34 through which the chicken's head is inserted during the drinking operation.

Each of the ends 36 of the trough 30 are recessed at 38 so as to serve as a cradle for the cylindrical water tank 40. This water tank is slightly longer than the trough so as to overlap at its ends. Reservoir 40 which is shown of cylindrical form, is provided with a depending open tube 42 adapted to extend downwardly into trough 30 and adjacent the bottom of the trough and below the openings 34 in side walls 32 to feed water to said trough.

It will be noted that as shown in Fig. 3, the liquid level in the trough will be at 44 and will remain substantially at that level as long as there is any water in tank 40. This is a common, well known principle of maintaining a predetermined liquid level in water troughs from an overhead supply and depends on the differential of pressure in the tank outside the tank to control the flow of water from the reservoir to the trough.

In the operation of this fountain, the operator positions the tank 40 with the tube 42 extending upwardly and fills the tank. When filled, he simply rolls the tank over into the position shown in Fig. 3 and a portion of the water will run out into the trough 30 until a seal is formed and the water level will be maintained. This method of feeding water to the trough insures a definite supply of water so long as there is a supply of water in the tank 40. This fountain may be made of any desired length or size to accommodate various numbers and sizes of poultry.

The chickens will necessarily need to walk up the foraminous runway to reach the watering trough so that litter carried on their feet will be dropped through the screen; furthermore, should the poultry stand on tank 40, droppings cannot enter the openings 34 because of the fact that the tank overhangs the side walls 32.

Since the tank 40 may be lifted from its position on trough 30 and the trough 30 removed from base member 10, they may be separately cleaned or treated and reassembled for use.

Having thus described the invention, what I claim as new and desire to be secured by Letters Patent is:

1. A poultry watering fountain comprising a base having inclined runways, an open top trough removably carried by said base between the upper portions of said runways and having apertured vertical side walls, a cylindrically shaped reservoir carried by said trough and forming a closing cover for said trough just above said apertures, adapted to supply water to said trough and to overlap and cover the top thereof.

2. A poultry watering fountain comprising a base having inclined runways, a trough having vertical side walls with apertures formed therein and recessed end walls removably carried by said base, and a cylindrical reservoir resting in the recessed end walls of said trough and overhanging and contacting the apertured walls thereof to form a cover therefor, and adapted to supply water to the trough at a substantially constant level adjacent the top of said runway.

3. A poultry watering fountain comprising a base having oppositely inclined runways spaced apart at their adjacent raised edges, a watering trough having vertical side walls with apertures formed therein and end walls arcuately recessed at their upper ends carried by said base between said runways with the apertures in said side walls positioned above the runways, and a cylindrical reservoir positioned above said trough in contact with said side and end walls to form a cover for said trough and having a protruding tube communicating with the feed trough below the apertures in said side walls and above the bottom thereof when the reservoir rests in the arcuate recesses of said ends to overhang all portions of said trough.

THOMAS K. FAULKNER.

REFERENCES CITED

The following references are of record in the file of this patent:

UNITED STATES PATENTS

| Number | Name | Date |
|---|---|---|
| 866,472 | Jones | Sept. 17, 1907 |
| 1,070,850 | Siddons | Aug. 19, 1913 |
| 1,228,727 | Wetzel, Jr. | June 5, 1917 |
| 1,361,045 | Giesy | Dec. 7, 1920 |
| 1,452,325 | Ternes | Apr. 17, 1923 |
| 1,515,256 | Kohlmeyer | Nov. 11, 1924 |
| 1,609,071 | Dykema | Nov. 30, 1926 |
| 1,834,516 | Dains | Dec. 1, 1931 |
| 1,871,804 | McGrew | Aug. 16, 1932 |

FOREIGN PATENTS

| Number | Country | Date |
|---|---|---|
| 592,510 | France | May 1, 1925 |